Feb. 20, 1945. C. E. REED 2,369,979
EARTH BORING TOOL
Filed Jan. 2, 1940 6 Sheets-Sheet 1
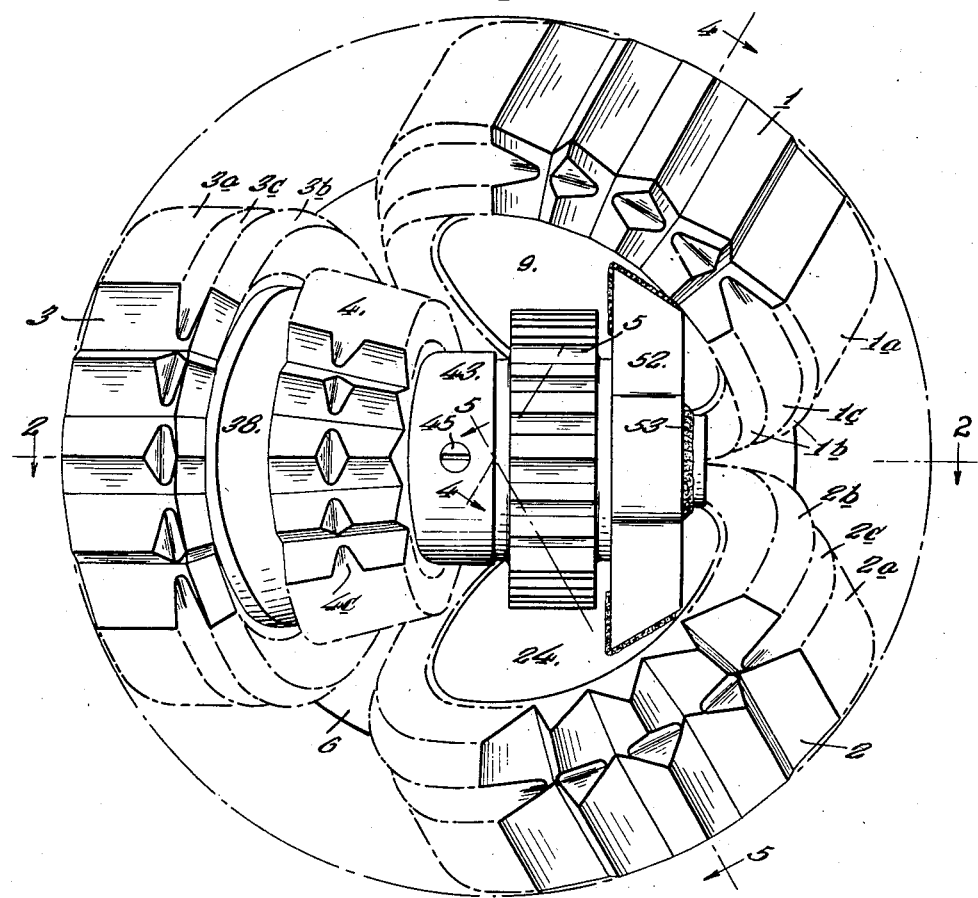
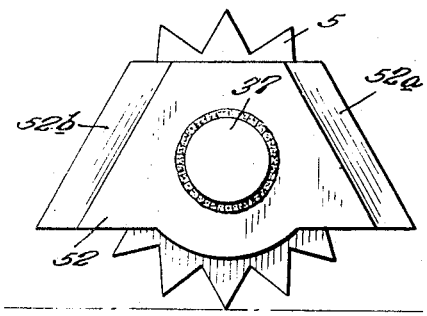
Inventor
Clarence E. Reed
Attorney

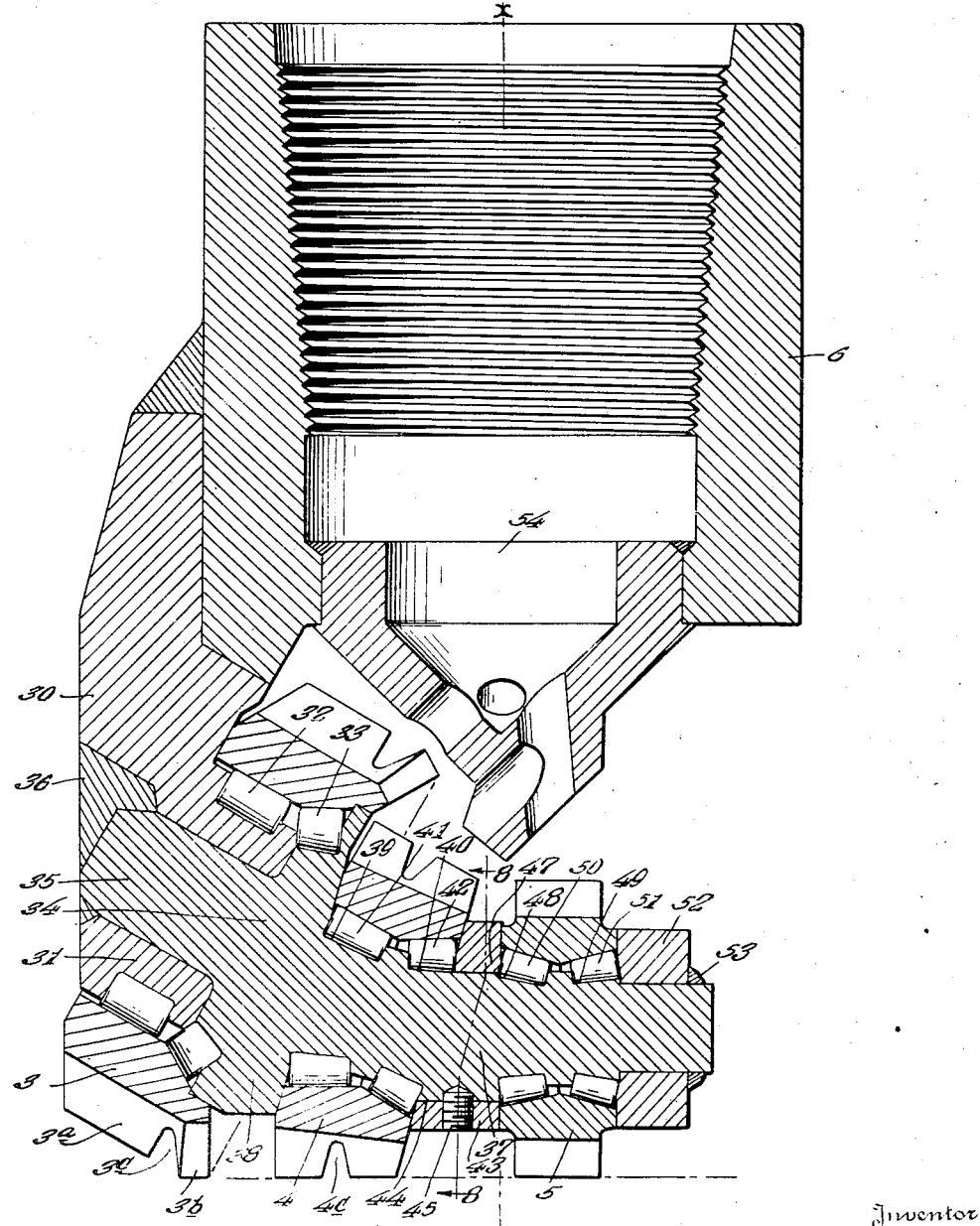

Feb. 20, 1945. C. E. REED 2,369,979
EARTH BORING TOOL
Filed Jan. 2, 1940 6 Sheets-Sheet 3
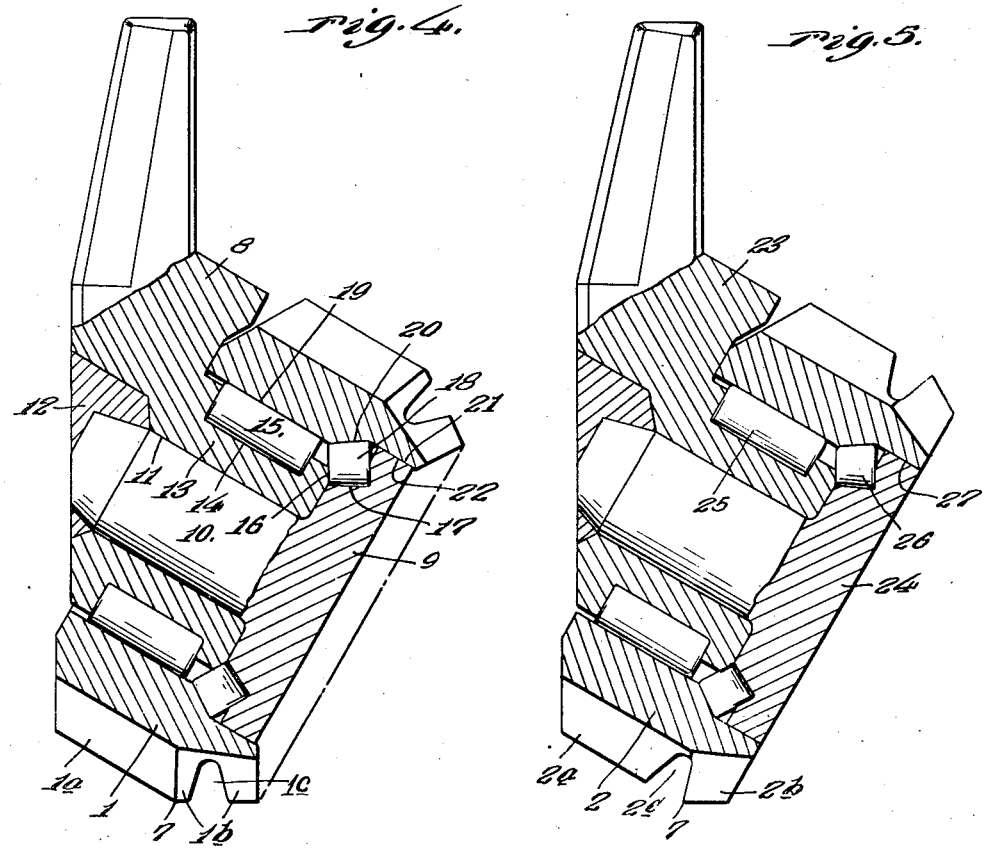
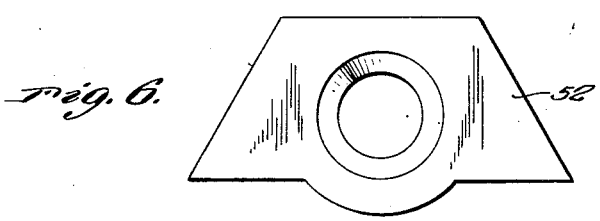
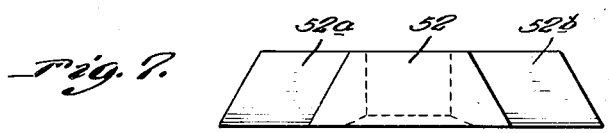
Inventor
Clarence E. Reed Feb. 20, 1945. C. E. REED 2,369,979
EARTH BORING TOOL
Filed Jan. 2, 1940 6 Sheets-Sheet 4
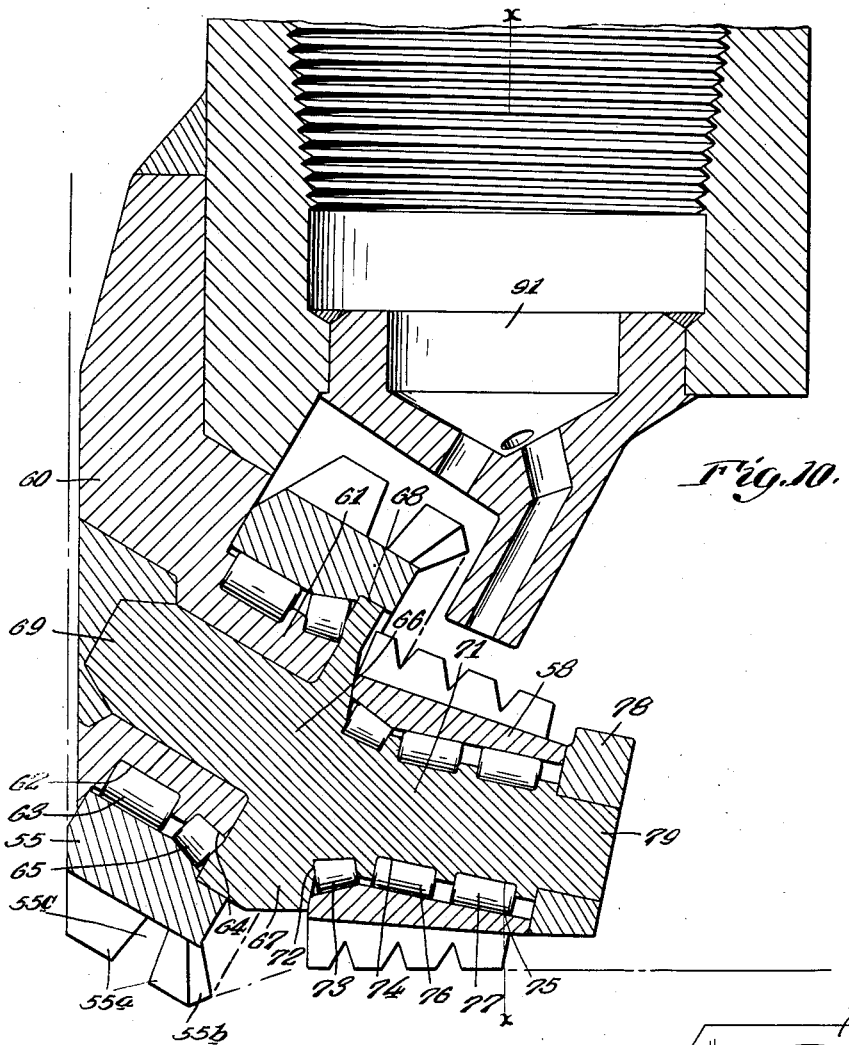
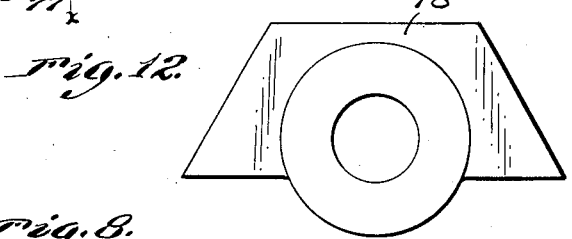
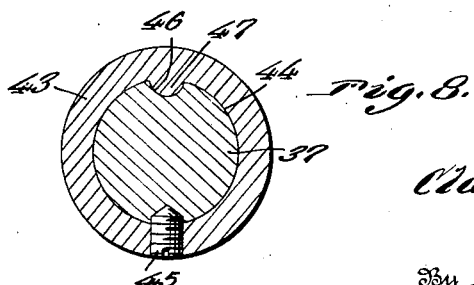
Inventor
Clarence E. Reed
By Spear, Donaldson & Hall
Attorney Feb. 20, 1945.　　　　C. E. REED　　　　2,369,979
EARTH BORING TOOL
Filed Jan. 2, 1940　　　　6 Sheets-Sheet 5

Inventor
Clarence E. Reed
By Spear, Donaldson & Hall
Attorney

Feb. 20, 1945.                C. E. REED                 2,369,979
                           EARTH BORING TOOL
                          Filed Jan. 2, 1940            6 Sheets-Sheet 6

Inventor
Clarence E. Reed
By Spear, Donaldson & Hall
Attorney

Patented Feb. 20, 1945

2,369,979

UNITED STATES PATENT OFFICE 2,369,979

EARTH BORING TOOL

Clarence E. Reed, Wichita, Kans., assignor to Chicago Pneumatic Tool Company, New York, N. Y., a corporation of New Jersey Application January 2, 1940, Serial No. 312,147

10 Claims. (Cl. 255—71)

This invention relates to earth boring tools of the type which includes a plurality of independently rotatable cutters for disintegrating the entire area of the bottom of a bore hole. In drills of this type, it is desirable that the cutters be of the largest possible size so that the maximum number of teeth will be provided upon them. Such large size cutters have an increased operating life and therefore the frequency with which the drills must be withdrawn from the bore hole for replacement of the cutters is reduced.

In accordance with the invention, cutters of especially large size may be used in the drill. This is made possible by an improved cutter arrangement, and by the provision of supporting means for the cutters which dispenses with the necessity of a central hanger or other carrier for supporting the inner ends of the spindles for the cutters.

In the accompanying drawings

Figure 1 is a bottom plan view of one embodiment of the invention.

Fig. 2 is a section on the line 2—2 of Figure 1, only the cutters in the sectional plan being shown.

Fig. 3 is an elevation of the righthand end of the spindle of Fig. 2.

Fig. 4 is a section on the line 4—4 of Figure 1.

Fig. 5 is a section on the line 5—5 of Figure 1.

Fig. 6 is an end elevation of the bridge member shown in Fig. 3.

Fig. 7 is a plan view of Fig. 6.

Fig. 8 is a section on line 8—8 of Fig. 2.

Fig. 10 is a section on the line 10—10 of Fig. 9, only the cutters in the sectional plan being illustrated.

Fig. 12 is an elevation of the bridge member of Fig. 11 from the opposite side.

Figure 9:
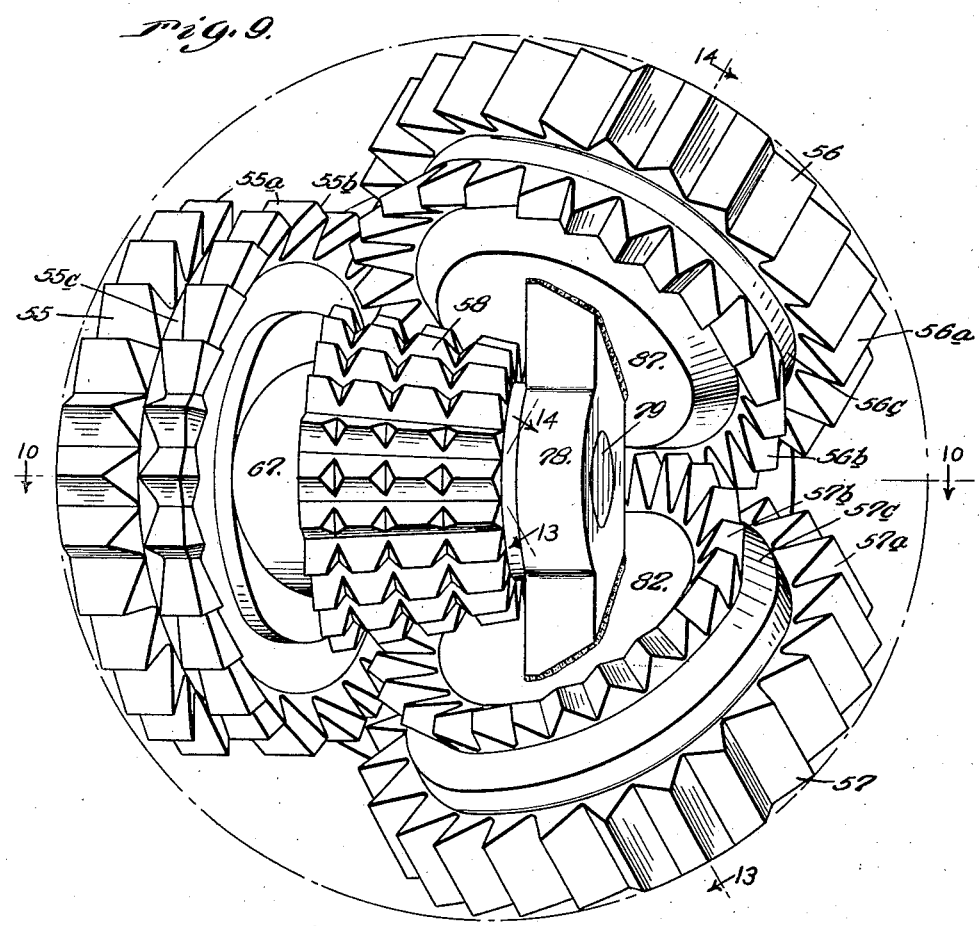
Fig. 9 is a bottom plan view of another embodiment of the invention.

Referring first to the embodiment of the invention illustrated in Figs. 1 to 8, the side cutters 1, 2, and 3 are rotatable about axes which are disposed in radial planes of the bit head which are 120° from each other. The intermediate cutter 4 and the central cutter 5 are rotatable about axes which are disposed in the same vertical plane containing the axis of rotation of the side cutter 3.

The side cutter 1 has a base portion of generally cylindrical formation having teeth 1a extending in an axial direction, and an inner portion of generally frusto-conical shape having teeth 1b thereon. These teeth are of the general formation disclosed in Reed Reissue Patent No. 15,126, dated June 14, 1921. Due to the fact that the cutter 1 rotates in a plane which inclines upwardly towards the drill axis, the cutter teeth of the base portion 1a cut an inclined area at the side of the bore hole which includes clearance for the bit head 6. Within the teeth 1b is formed a groove 1c. The teeth 1b cut an area upon the bottom of the bore hole which is in a generally horizontal plane, and this horizontal plane meets the inclined area cut by the teeth 1a at a point 7 indicated in Fig. 4.

The cutter 2 rotates in a plane which converges upwardly towards the bit head axis. Preferably this cutter is of the same diameter as the cutter 1, and the teeth 2a upon the base portion thereof operate upon the same inclined area which is cut by the teeth 1a of the base portion of cutter 1. The inner portion of the cutter teeth 2a are cut away to form a groove 2c. The area cut by the teeth 2b extends outwardly to the junction point 7, and is upon the same horizontal plane as the areas cut by teeth 1b.

The side cutter 3 rotates in a plane which also converges upwardly towards the drill axis. This cutter is of the same diameter as the other side cutters, and its teeth 3a track the inclined area at the side of the bore hole which is cut by the teeth 1a and 2a. The inner extremities of these teeth are cut away by a groove 3c. The teeth 3b upon the frusto-conical portion of the cutter operate upon the horizontal area of the bottom of the bore hole, and these teeth cut outwardly to the junction point 7. The areas left uncut by the groove 2c of cutter 2 and the groove 3c of cutter 3 will be cut by the inner portions of the teeth 1a so that the entire inclined area at the side of the bore hole will be cut. The area left uncut by the groove 1c of cutter 1 will be disintegrated by the teeth 2b and 3b of the other two side cutters. Preferably the teeth 2b will be of greater axial extent than the teeth 3b so as to extend the area inwardly from the junction point 7 a greater distance towards the center of the drill.

The axis of rotation of the intermediate cutter 4 is at an angle to the axis of rotation of the side cutter 3 so that the planes of rotation of these cutters converge upwardly within the bit head. This cutter preferably is of smaller diameter than cutter 3 and is offset below the side cutter 3, and its teeth operate upon the same horizontal plane which is cut by teeth 1b, 2b, and 3b. The periphery of this cutter 4 is of generally frusto-conical formation. Preferably the outer extremity of the area cut by the teeth of cutter 4 extends to the inner extremity of the area cut by the teeth 2b. A groove 4c may be formed in the teeth.

The central cutter 5 is preferably of cylindrical formation and it rotates upon an axis which is horizontal so that its teeth act upon the same horizontal plane upon which the teeth of cutter 4 and the teeth 1b, 2b, and 3b act. By being disposed close to the axis x—x of rotation of the drill head, the teeth of cutter 5 disintegrate a circular area at the center of the bore hole, and this area extends outwardly to the inner extremity of the area cut by the teeth of cutter 4. Cutter 5 is disposed upon the opposite side of the bit head axis from the cutters 3 and 4.

The entire area of the bottom of the bore hole will consequently be cut by the five cutters. The area at the side of the bore hole which is of greatest extent will be disintegrated by the three tracking cutters 1, 2, and 3, and the central part of the hole which is of lesser area will be disintegrated by the cutters 4 and 5. Because of the arrangement of these cutters so that their masses are substantially equally disposed about the bit head axis, a uniform cutting effect will result, and the drill will tend to cut a straight hole.

To support the cutter 1 a side hanger 8 having a removable end spindle portion 9 is provided. The side hanger 8 is of the type disclosed and claimed in Patent No. 2,058,625 to C. E. Reed, dated October 27, 1936. The removable spindle portion 9 includes a stem 10 which is inserted in a bore hole 11 of the hanger 8, and these parts are held assembled by welding applied at 12. Within the spindle portion 13 of hanger 8 is formed a grooved raceway 14 to receive cylindrical anti-friction rollers 15. The outer end of the spindle portion 13 is beveled at 16 and this surface 16 cooperates with a groove 17 formed in the inner face of the flanged part of spindle portion 9 to constitute a raceway to receive frusto-conical anti-friction bearings 18. The interior of the cutter 1 includes a cylindrical surface 19 which bears upon the rollers 15, and an inclined surface 20 which bears upon the rollers 18. At its innermost end the cutter includes a cylindrical surface 21 which has a frictional bearing contact upon the peripheral surface 22 of the flanged portion of the part 9.

To assemble the cutter 1 and its bearings upon its hanger the bearings 15 are first disposed in place in the raceway 14. The cutter then is positioned axially over the spindle portion 13 to be disposed upon these bearings. The removable spindle portion 9 and the bearings 18 are then assembled in place by inserting the stem 10 into the bore hole 11 of hanger 8. When assembled the rollers 18 prevent dislodgement of the cutter from its spindle. The frictional bearing surface at 21, 22 tends to maintain the axial alignment of the cutter and the spindle.

The hanger 23 and the removable spindle portion 24 for supporting the side cutter 2 preferably are of the same formation of the hanger 8 and removable portion 9 for the cutter 1. Thus the internal bearing surfaces of the cutter and the external bearing surfaces of the hanger 23 and removable spindle portion 24 provide raceways for the cylindrical roller bearings 25, the frusto-conical roller bearings 26, and the frictional bearing surfaces 27, which are of the exact dimensions of the corresponding portions for the cutter 1. The fact that the teeth 1b of cutter 1 cut an annular area at the bottom of the bore hole which extends further inwardly toward the drill axis than the area cut by the teeth 2b, is due to the greater axial length of the cutter 1.

The cutter 3 is supported upon a hanger 30, which is similar to the hangers 8 and 23. The spindle portion 31 of this hanger, however, is of less axial extent, and the raceway for the anti-friction roller bearings 32 also is of less axial extent. To retain the frusto-conical roller bearings 33 in place at the end of spindle 31, a removable spindle portion 34 is provided which is retained in position by welding at 36 in a manner similar to that described for cutter 1. The removable spindle portion 34, however, includes bearing surfaces for supporting the intermediate roller cutter 4 and the central roller cutter 5.

This support for the cutters 4 and 5 consists of a projection 37 extending from the opposite side of the enlarged flange portion 38 from the stem portion 35. Adjacent this flange 38 and in the projecting portion 37 is formed a raceway 39 and a second raceway 40 for receiving the roller bearings 41 and 42, respectively, for the intermediate cutter 4. The raceways 39 and 40 converge inwardly toward each other, and the roller bearings 41 and 42 preferably are of frusto-conical formation. In order to hold the roller bearings 42 against displacement, a removable collar 43 may be affixed upon a cylindrical surface 44 of the projecting portion 37, by means of a set screw 45.

To assemble the cutter 4 and its roller bearings in place, the roller bearings 41 are first located in the raceway 39, and then the cutter 4 is moved axially over the free end of the projecting portion 37 and upon the roller bearings 41. The roller bearings 42 are then inserted within the cutter and upon the raceway 40 by movement through a notch 46 formed in the upper part of the surface 44. This notch 46 is closed by a lug 47 formed on the internal surface of the retaining ring 43. When the retaining ring 43 is in position, it therefore not only serves to prevent displacement of the roller bearings 42, but due to the arrangement and formation of these bearings, serves to retain the cutter 4 in place.

To support the central cutter 5, raceways 48 and 49 are formed in the outer end of the projecting spindle portion 37 for frusto-conical antifriction roller bearings 50 and 51. The roller bearings 51 are held in place, and consequently the cutter 5 is prevented from axial displacement by a bridge or strut member 52 located upon the extreme reduced end portion of the projecting spindle part 37. In assembling the cutter 5, the roller bearings 50 are first located in the raceway 48. The cutter 5 is then passed over the free end of the spindle and upon the rollers 50, and the roller bearings 51 are then inserted into the cutter and upon their raceway 49. The bridge or strut member 52 which serves as a retainer for the cutter 5 may be affixed to the projecting spindle portion 37 by means of welding applied at 53.

The bridge member 52 not only serves to retain cutter 5 in position, but it moreover serves as a support for the inner ends of the spindles for cutters 1 and 2. This constitutes an important feature of the invention because the inner ends of the removable spindle portions 9 and 24 and the inner end of the spindle portion 37 receive support from each other, and the necessity for a central supporting element for these inner ends of the spindle is dispensed with. Because of the elimination of any central hangers or other supports, all of the cutters, and particularly the side cutters, may be made of unusually large diameters.

In order that the bridge member 52 will have a firm bearing upon the inner ends of the spindle portions 9 and 24, the outer extremities of the arms of this bridge member are faced off at such an angle that flat surfaces 52a, 52b will be presented against the inner ends of the spindle portions 9 and 24. The necessary angular relation for these abutting faces of the extremities of the arms of bridge member 52 is shown in Figs. 3, 6, and 7. Preferably the bridge member 52 will be welded to the faces of the spindle members 9 and 24 so that a solid formation will result. However, the invention contemplates the formation of the bridge member 52 and the spindle portions 9 and 24 in one piece, so that an extremely rigid construction will result.

To position the cutter assemblies in the bit head, it is first necessary that the cutters 1 and 2 be assembled upon their hangers 8 and 23, respectively, together with their removable portions 9 and 24, and that these assemblies be first affixed in proper position in the bit head. The assembly, including the side cutter 3, intermediate cutter 4, central cutter 5, and its hanger 30 and spindle portion 34, together with the bridge or strut member 52, should be placed as a unit in the bit head so that the hanger 30 is in its proper position and the arms of the bridge member 52 will abut against the inner faces of the removable spindle portions 9 and 24. The bridge member 52 may then be welded not only to the end of projecting spindle portion 37, but to the spindle portions 9 and 24 as well.

To direct flushing fluid upon these several cutters, a removable nozzle element 54 may be welded in place in a central opening in the bottom of the bit head. This nozzle element should be formed with a plurality of openings so directed that each one of the cutters will receive a stream of the flushing fluid. It is, of course, necessary that this nozzle element be located in place in the bit head before the cutters and their spindle supports are affixed to the bit head.

In the embodiment of the invention illustrated in Figs. 9 to 14, the same general arrangement of side cutters illustrated in the first embodiment of the invention is present. A principal difference of this second embodiment over the first embodiment resides in the fact that these side cutters 55, 56, and 57 are of larger diameters so that the teeth upon their frusto-conical portions interfit. An additional distinction over the first embodiment of the invention is that the central area of the bore hole is cut by a frusto-conical cutter 58 instead of by two cutters.

The side cutter 55 is rotatable about an axis which lies in the same radial plane of the bit head which contains the axis of rotation of the frusto-conical member 58, and this side cutter is of less axial length than the other two side cutters. The base portion of side cutter 55 includes teeth 55a which are divided at their central part by a deep groove 55c. At the inner end of the cutter, teeth 55b are formed upon a frusto-conical portion of the cutter. Teeth 55a cut an inclined area at the side of the bore hole which includes clearance for the bit head, and teeth 55b cut an inclined area which slopes upwardly toward the center of the drill hole. These teeth 55a and 55b cut the area at the junction of these two inclined areas.

Cutter 56 includes a base portion having teeth 56a which track the inclined area cut by the teeth 55a. Cutter 56 also includes teeth 56b upon a frusto-conical inner portion of the cutter, and which cut a separate zone upon the same inclined area determined by the teeth 55b. The teeth 56b are separated from the teeth 56a by a wide and deep groove 56c, and the teeth 56b are disposed so as to cut a path which is next inwardly from and does not overlap the path cut by the teeth 55b. The area which is left uncut by the wide groove 56c is cut by the teeth 55b and the adjoining portions of the teeth 55a of cutter 55.

Cutter 57 includes a base portion having teeth 57a which track upon the same inclined area cut by teeth 55a and 56a, and this cutter also includes teeth 57b upon a frusto-conical inner portion thereof which operate upon the inclined central area of the drill hole defined by the teeth 55b and 56b. Teeth 57b cut a path upon this inclined central area which is next inwardly from the zone cut by teeth 56b. The wide groove 57c between teeth 57a and 57b therefore leaves an uncut area which is disintegrated by the teeth 56b and by teeth 55b and the adjacent part of teeth 55a.

The frusto-conical cutter 58 is located adjacent the drill head axis and cuts a circular area at the center of the hole. The outer extremity of this circular area extends nearly to the inner extremity of the annular area cut by the teeth 57b. The circular area which is cut by cutter 58 preferably is disposed in a horizontal plane.

These four cutters, including the three side cutters 55, 56, and 57, and the central frusto-conical cutter 58, thereby disintegrate the entire bottom of the bore hole. The outer portions of teeth 55a, 56a, and 57a cut upon the same inclined area at the side of the drill hole. The inner portions of teeth 56a and 57a track each other and cut the area left uncut by the groove 55c of cutter 55. The inner portions of teeth 55a cut the next inwardly disposed area from that cut by the teeth 56a and 57a, and this area cut by the inner portions of 55a extends up to the junction point of the inclined side zone and the inclined next inwardly disposed zone. Teeth 55b, 56b, and 57b cut progressively inwardly disposed areas of the bottom of the drill hole from the junction point aforesaid up to the circular area cut by the frusto-conical cutter 58. As has been noted, the teeth 55b, 56b, and 57b all operate upon the same inclined or generally conical surface disposed between the horizontal area cut by cutter 58 and the inclined side area.

On reference to Fig. 9 it will be observed that the teeth at the inner portions of the cutters 55, 56, and 57 interfit or intermesh with each other. Thus the teeth 55b and the inner adjacent portions of teeth 55a enter into the groove 56c of cutter 56, and the teeth 56b and teeth 55b therefore overlap. Teeth 56b extend into groove 57c of cutter 57 during the rotation of these cutters, and the teeth 57b and 56b therefore overlap each other. Teeth 55b extend into groove 57c of cutter 57 during the rotation of these cutters, and the teeth 55b therefore overlap the teeth 57b, although they are separated by a space which corresponds to the thickness of teeth 56b. Due to this interfitting relationship between the teeth of the several side cutters, they may be made of considerably larger diameter than the side cutters of the first embodiment of the invention, and this enlarged size of the cutters is made possible, as has been stated, because of the absence of any central supporting members depending from the bit head.

On reference to Figure 9 it will be noted that the three side cutter assemblies have teeth which aggregate in width of annular area of said assemblies on the order of two times the annular width of the center cutter, the width of each row being counted only once. Thus if the length of the teeth 55a, 55b, 56a, 56b, 57a, and 57b are added together, the resulting aggregate length will be approximately twice as long as the center cutter 58. This relationship is of importance because the outermost portion of the hole is of greatest area. The center cutter disintegrates an area that is relatively small and its radius short. In this invention, the center cutter is designed for strength enough not to break, and for a minimum of work for high bit efficiency, and the emphasis respecting the center cutter is on its relative over-all or axial length, or annular path width. The three side cutters are relatively large and have ample bearings. The relationship stated above effects high operating efficiency of tooth penetration, speed of bit operation, and bit durability, because the heavy operating loads fall upon the side cutters and not on the center cutter, and the center cutter, being relatively small and of short radius respecting its annular path, does not "ride" the earth formation it is intended to cut. Long center cutters do "ride" the formation. The side cutter tooth arrangement of this invention is not possible with a long center cutter. "Riding" retards bit advance or penetration and reduces speed of operation, and increases destructive effects of the bit contacts with bottom.

Cutter 55 is carried upon a hanger 60 having a projecting spindle portion 61 which provides a grooved raceway 62 for receiving cylindrical anti-friction bearings 63 and a grooved raceway 64 for receiving frusto-conical anti-friction rollers 65. To retain the bearing 65 in position and thereby prevent displacement of the cutter 55, a removable spindle portion 66 is attached to the hanger 60. This removable spindle portion 66 includes a flanged enlargement 67 which provides an inner face contacting the outer ends of rollers 65, and also provides upon its periphery a cylindrical frictional bearing surface 68. The cutter 55 includes internal surfaces which bear upon the rollers 63 and 65, and also includes a bearing surface which frictionally engages the outer periphery 68 of flange 67.

To assemble the cutter 55, the bearings 63 are first located in their raceway 62, and the cutter 55 is then placed in position upon the spindle. The frusto-conical bearings 65 are then placed in position upon their raceway 64, this being made possible by the large size of the internal surface of the cutter which bears upon the peripheral surface 68. The removable spindle member 67 is then located in position by inserting its stem portion 69 in the bore within the spindle portion 61.

The frusto-conical cutter 58 is rotatably mounted upon the projecting portion 71 of the removable spindle portion 66. This projecting portion 71 is on the opposite side of flanged enlargement 67 from the stem portion 69, and the spindle portion 71 is offset below the axis of the stem portion 69. At the junction of the projecting spindle portion 71 and the flange 67, is formed a raceway 72 for receiving frusto-conical anti-friction rollers 73. Next along the length of the projecting spindle portion 71 are formed raceways 74 and 75 to receive cylindrical anti-frictional roller bearings 76 and 77, respectively. In assembling this cutter, it is necessary that these several roller bearings be in position in their raceways so that the cutter may be inserted over the free end of the spindle to bring its internal bearing surfaces upon these roller bearings. To retain the cutter 58 in place, a bridge or strut member 78 is positioned upon the reduced free end portion 79 of spindle portion 71, the inner end of the frusto-conical cutter bearing directly against the inner side face of this bridge or strut member.

Figure 13:
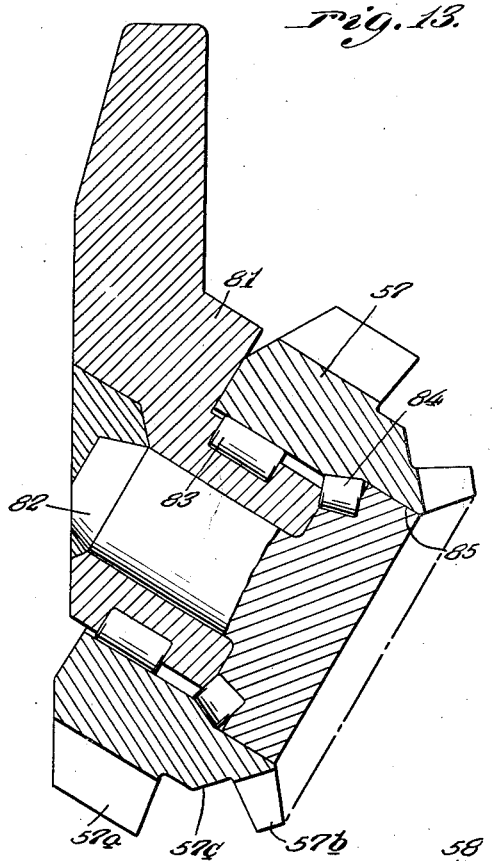
Fig. 13 is a section on line 13—13 of Fig. 9.
Figure 14:
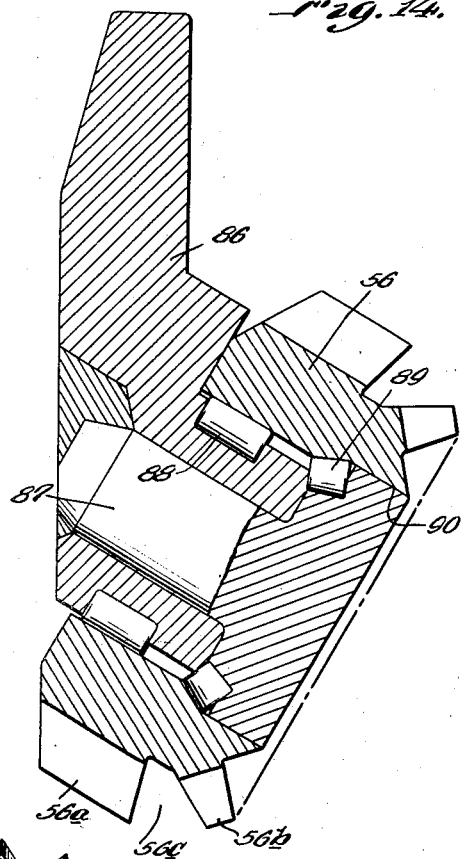
Fig. 14 is a section on line 14—14 of Fig. 9.
Figure 11:
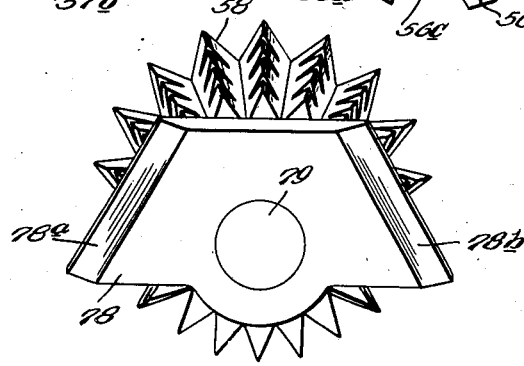
Fig. 11 is an elevation of the righthand end of the spindle of Fig. 10.

Cutters 56 and 57 preferably are supported upon side carrier assemblies which include a hanger and a removable spindle portion similar to those for cutters 1 and 2. As shown in Fig. 13, the cutter 57 is carried upon a side hanger 81 and its complemental removable spindle portion 82. The cutter rotates upon cylindrical rollers 83, frusto-conical rollers 84, and frictional bearing surfaces at 85.

The support for cutter 56 which includes hanger 86 and its removable spindle portion 87 preferably is of the exact formation of the support for cutter 57 to simplify fabrication and replacement. Rollers 88 and 89 and frictional bearing surfaces at 90 rotatably mount the cutter 56. The internal bearing surfaces of cutter 56 necessarily are in the same relation to each other as the internal bearing surfaces of cutter 57 since they are mounted upon identically formed supports.

The dotted line, Fig. 9, represents the wall of the bore hole generated by the drill, and it will be observed from Fig. 9 that the three side cutters are symmetrical in arrangement and the diameters are uniform and largest that could be selected for the cutters that would rotate freely without excessive digging into the side wall of the hole, and that the annular paths of the respective rows of teeth are substantially the same width for each cutter, measured radially of the drill, but all of the rows do not track each other, and the over-all width of the three cutters is more than the total width of effective cutting edges of the teeth.

The manner of assembling the cutters and their carriers in the embodiment of the invention illustrated in Figs. 9 to 14, inclusive, is similar to that for the first embodiment of the invention. As with the first embodiment of the invention, it is necessary that the nozzle member 91 be first affixed at the lower end of the bit head. The cutters 56 and 57 and their carriers are then affixed in the bit head, and thereafter the assembly, including the side cutter 55 and the central frusto-conical cutter 58 is affixed in the bit head so as to bring the faces 78a, 78b of the arms of the bridge member 78 against the inner faces of removable spindle portions 82 and 87 for cutters 56 and 57 respectively. Welding may then be applied to secure the bridge member 78 to the reduced spindle end 78 and to the faces of the spindle members 82 and 87.

Figure 15:
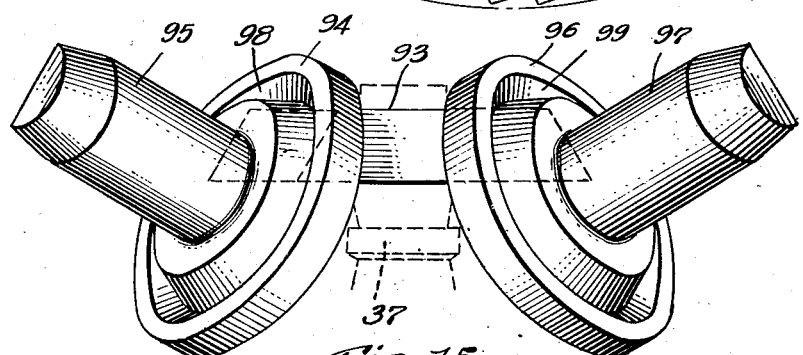
Fig. 15 is a plan of a modification of the bridge member.

Fig. 15 shows a construction in which the removable spindle sections are formed integrally with the central bridge member. In this figure, the central bridge member 93 has formed integrally with it and at one end thereof a flange 94 from the side face of which projects the stem 95. To the other end of the bridge member 93 is integrally formed a flange 96 from the side face of which projects a stem 97. Into the side of flange 94 from which the stem 95 projects is formed a groove 98 to constitute a raceway for anti-friction bearings. A similar groove 99 is formed in the side face of flange 96 to receive other anti-friction roller bearings. Through the central part of the bridge member 93 may be formed a bore hole to receive the free end of a roller cutter supporting spindle. The integral formation shown in Fig. 15 may be employed instead of the separate bridge member 52 shown in Figs. 6 and 7 and the separate removable spindle sections 9 and 24 shown in Figs. 4 and 5. If desired, the bridge member 78 shown in Fig. 12 may be integrally formed with the removable spindle portions 82 and 87 shown in Figs. 13 and 14.

In the assembly of an earth boring tool employing the integral bridge and removable spindle section of Fig. 15, the entire cutter assembly would be made with the spindle supports apart from the bit head. That is, if this integral member were to be employed in the construction of Fig. 1, the side cutter 1 and its anti-friction bearings and the side hanger 8 would be associated with the stem 97 and flange 96. In like manner, the cutter 2 and its anti-friction bearings and hanger 23 would be associated with the stem 95 and flange 94. The assembly consisting of the side cutter 3 and cutters 4 and 5, together with the hanger 36, would then be made, and the free end of the spindle 37 (shown in dotted lines) of this assembly would be inserted in the bore hole through the bridge member 93. The complete assembly thus made would then be attached to the bit head by inserting the shanks of the side hangers 8, 23, and 36 upwardly into their respective recesses in the bit head.

It is to be understood that it will be entirely possible to substitute for the side cutters shown in Figure 1 the side cutters shown in Fig. 9, or conversely, to substitute for the side cutters of Fig. 9 the side cutters of Figure 1. Other similar modifications of the invention are within the scope of the invention. For example, instead of a bore in the bridge member, a slot may be formed therein opening downwardly so that the spindle end beyond the central cutter may be dropped therein when the assembly is made. The slot would then be closed by welding.

In both embodiments of the invention the presence of the bridge member joining the inner ends of the three spindles or cutter supports, results in an extremely rigid formation since each spindle receives support from the other two. By mounting the bridge member upon one of the spindles and providing it with broad bearing faces to abut the inner ends of the other two spindles, the forces imposed upon it are adequately sustained. In both instances illustrated, the bearing faces of the bridge member are generally oppositely facing and converge toward each other both laterally and longitudinally of these faces.

I claim:

1. An earth boring drill comprising three rotary side cutters, two of said cutters each having a base row of teeth positioned outermost of the drill and of substantially coextensive length whereby they track the same annular area at the side of the bore hole, said cutters also each having another row of teeth spaced from the base row of teeth and positioned at different distances therefrom whereby they cut separate but adjoining areas upon the hole bottom, the third cutter having a base row of teeth of less length than the base row of teeth on said two cutters and positioned at the side of the drill whereby it tracks only the outer portion of the area tracked by said two cutters, and said third cutter also including a row of teeth spaced from the base row and positioned to cut the area between the areas cut by said two cutters.

2. An earth boring drill comprising a drill head, three inclined side roller cutters of different axial lengths for cutting an annular area at the side of the drill hole including clearance for the bit head, other roller cutter means adjacent the drill axis for disintegrating a central circular area of the bottom of the hole extending outwardly to said annular area, means attached to the drill head for rotatably supporting the central roller cutter means and the one of the side roller cutters which is of least axial length, and means attached to the drill head for rotatably supporting the other two side cutters.

3. An earth boring drill according to claim 2 in which said central roller cutter means is a single frusto-conical cutter.

4. An earth boring drill according to claim 2 in which the side roller cutters each have an outer approximately cylindrical cutting surface and an inner frusto-conical cutting surface.

5. An earth boring drill comprising three inclined side roller cutters, each having rows of teeth thereon which interfit with rows of teeth of the other side cutters, said cutters disintegrating an annular area at the side of the drill including clearance for the bit head, and other rotary cutter means adjacent the drill axis for disintegrating a central circular area at the bottom of the hole extending outwardly to said annular area.

6. In a roller boring drill, three side cutters of uniform diameter disposed outermost of the drill and rotatable upon axes inclining downwardly toward the drill axis, said side cutters each having an outer approximately cylindrical cutting surface thereon and also an inner frusto-conical cutter surface, and inwardly from one of said cutters and on the same side of the bit axis other cutting means extending to substantially the longitudinal axis of the drill, said side cutters being of larger diameter than said other cutting means.

7. An earth boring drill comprising a drill head, a central roller cutter, three inclined side roller cutters of different axial lengths, of uniform diameter larger than said center cutter, said side cutters each having rows of teeth positioned thereon in planes inclined to each other, said center roller cutter being on the same side of the drill axis as one of the side cutters and extending substantially to the drill axis, spindle means for the cutters attached to the sides of the drill head, and means connecting the inner ends of said spindles together independently of said head.

8. A drill bit comprising three rotary side cutters, each having an outermost row of teeth thereon having their cutting edges disposed at an acute angle to the drill axis and tracking each other over an annular area at the side of a bore hole as the drill is rotated, said annular area inclining downwardly and inwardly, each of said cutters having a relatively wide groove in its cutting surface adjacent said row of teeth, and each of said cutters having one other row of teeth thereon spaced inwardly a different distance than the spacing of the rows of teeth on the other cutters for disintegrating different annular areas progressively inwardly from said first mentioned annular area, the cutting edges of said other row of teeth of each side cutter being at a different angle to the drill axis from the cutting edges of said outermost rows of teeth to cut in a plane inclined to said annular area at the side of the bore hole, and other rotary cutter means adjacent the drill axis for independent cutting action inwardly of the other cutters and about the axis of the drill bit.

9. A drill bit comprising three rotary side cutters, each having an outermost row of teeth thereon having their cutting edges disposed at an acute angle to the drill axis and tracking each other over an annular area at the side of a bore hole as the drill is rotated, said annular area inclining downwardly and inwardly, each of said cutters having a relatively wide groove in its cutting surface adjacent said row of teeth, and each of said cutters having one other row of teeth thereon and positioned in offset relationship to each said other row so as to cut separate annular areas inwardly of the annular area cut by said tracking rows of teeth, and independently rotating cutter means adjacent the drill axis for cutting action inwardly of the other cutters and about the axis of the drill bit.

10. An earth boring drill comprising three cutters mounted to rotate about axes inclining downwardly and inwardly toward the axis of revolution to the drill, the cutters having circumferential rows of teeth thereon, one of the cutters having a wide circumferential groove separating two adjacent rows of teeth, each of the other two cutters having a row of relatively narrow teeth extending into said groove, and an independently rotatable center cutter means.

CLARENCE E. REED.